United States Patent [19]
DeMetz, Sr.

[11] Patent Number: 5,060,206
[45] Date of Patent: Oct. 22, 1991

[54] MARINE ACOUSTIC AEROBUOY AND METHOD OF OPERATION

[75] Inventor: Frederick C. DeMetz, Sr., Panama City, Fla.

[73] Assignee: Allied-Signal Inc., Morristownship, N.J.

[21] Appl. No.: 587,389

[22] Filed: Sep. 25, 1990

[51] Int. Cl.[5] .............................................. H04B 1/06
[52] U.S. Cl. ........................................ 367/136; 367/3
[58] Field of Search ................. 367/135, 136, 93, 118, 367/906, 3, 6

[56] References Cited

U.S. PATENT DOCUMENTS

| | | | |
|---|---|---|---|
| 1,320,142 | 10/1919 | Hanson | 343/709 |
| 3,258,595 | 6/1966 | Galante | 340/850 |
| 3,651,286 | 3/1972 | Gorike et al. | 381/159 |
| 3,972,046 | 7/1976 | Lombardi | 343/709 |
| 3,999,183 | 12/1976 | Brett | 343/709 |
| 4,021,661 | 5/1977 | Levine | 340/85 |
| 4,030,100 | 6/1977 | Perrotti | 343/709 |
| 4,114,135 | 9/1978 | Funk | 367/6 |
| 4,189,786 | 2/1980 | Adler | 367/4 |
| 4,203,109 | 5/1980 | Ballard et al. | 340/850 |
| 4,227,479 | 10/1980 | Gertler et al. | 114/312 |
| 4,509,151 | 4/1985 | Anderson | 367/118 |
| 4,533,945 | 8/1985 | Lauvray et al. | 358/109 |
| 4,719,606 | 1/1988 | Andrieu | 367/135 |
| 4,766,441 | 8/1988 | Phillips et al. | 343/709 |

*Primary Examiner*—Daniel T. Pihulic
*Attorney, Agent, or Firm*—Robert A. Walsh; James W. McFarland

[57] ABSTRACT

A marine acoustic detector for use in identifying a characteristic airborne sound pressure field generated by a propeller-driven aircraft including a surface-buoyed resonator chamber tuned to the narrow frequency band of the airborne sound pressure field and having a dimensioned opening formed into a first endplate of the chambver for admitting the airborne sound pressure field. Mounted within the resonator chamber is a transducer circuit comprising a microphone and a pre-amplifier, the microphone functioning to detect the resonating sound pressure field within the chamber and to convert the resonating sound waves into an electrical signal while the pre-amplifier functions to amplify the electrical signal for transmission via a cable to an underwater or surface marine vehicle to undergo signal processing. The sound amplification properties of the resonator air chamber are exploited in the passive detection of propeller-driven aircraft at airborne ranges exceeding thoses ranges of visual or sonar detection to provide 44 dB of received sound amplification at common aircraft frequencies below 100 Hz.

20 Claims, 2 Drawing Sheets

MARINE ACOUSTIC AEROBUOY AND METHOD OF OPERATION

BACKGROUND OF THE INVENTION

This invention relates to acoustic detectors for identifying aircraft in a marine environment, and more particularly, to a new and improved acoustic detector and method of operation, the detector being of the type employing a surface-buoyed acoustic air resonator for providing early detection of propeller-driven reconnaissance type aircraft by underwater marine vehicles.

In the field of intelligence gathering, various methods have been utilized in an attempt to identify propeller-driven aircraft whose primary mission is reconnaissance of the open seas for locating underwater marine vehicles. Because of the inherent danger posed by approaching reconnaissance aircraft to the underwater vehicles, clandestine detection is desirable. Thus, in the past, substantial effort has been employed to identify certain characteristics exhibited by propeller-driven aircraft. One of those characteristics is the Blade Passage Rate sound wave generated by the propeller blades of distant aircraft. This Blade Passage Rate sound wave is the dominate radiated noise mechanism and is generated by the propeller blades of the aircraft cutting through air and has a characteristic frequency which can be identified for a particular type aircraft. Such a characteristic frequency can be determined by multiplying the number of propeller blades times the propeller revolutions per minute (RPM) and then dividing this product by sixty (60) to arrive at the characteristic frequency in cycles/second (Hz). Generally, such characteristic frequencies range below 100 Hz.

An obvious method of clandestine detection is to identify these characteristic frequencies by an underwater acoustic means. However, the detection of aircraft by such underwater acoustic means is severely limited in range due to the physics of aircraft sound propagation in the ocean. Consequently, the poor propagation of propeller characteristic sound frequencies beneath the surface of the ocean prevents aircraft detection with underwater vehicle sonar at sufficient ranges to permit evasive action by the vehicle. Generally, when sound waves strike the surface of the water obliquely, they are reflected. Sound waves can enter the ocean if the sound wave strikes the water on a vertical path which is nearly perpendicular to the surface of the water. If the sound wave does enter the ocean, it bounces in a surface and bottom bounce path in a zig-zag fashion resulting in substantial attenuation of the sound wave as it propagates horizontally. The aforementioned attenuation causes the sound waves to be indistinguishable from background noise to an underwater sensor located only a few miles away.

Much effort has been expended it an attempt to solve the above-described problem. For example, U.S. Pat. No. 4,533,945 issued to Lauvray et al. discloses an apparatus equipped with a television camera or with a radio or radar antenna and connected to an underwater vehicle by a cable. The apparatus or missile is initially ejected from a tube on-board the vehicle. The missile, which is highly buoyant and having a low hydrodynamic drag, and the cable rise at a high speed in a rotating fashion to the surface of the ocean and "springs" vertically out of the water to permit an on-board camera to scan the horizon.

U.S. Pat. No. 3,258,595 issued to Galante discloses a similarly sophisticated vertically oriented buoy that is operatively associated by laser communication with a submerged vehicle. The dome cover of the buoy extends vertically above the water line for permitting a television camera to detect surface and airborne craft.

U.S. Pat. No. 3,651,286 issued to Gorike et al. discloses a microphone assembly of the Lavalier type mounted within a casing in a manner to achieve the dampening of the noise which is transmitted through the casing. The improvement in the microphone assembly comprises a support for the forward end of the microphone capsule including a cap portion defining an outwardly extending annular collar adjacent to an acoustic inlet. Further, a resilient vibration-absorbing annular molding embraces the collar with the outer periphery of the annular molding engaging the inner surface of the casing. It is noted in Gorike et al. that the collar together with an air chamber defined between the cap and the diaphragm form a Helmholtz resonator designed to provide a damping effect at higher frequencies.

U.S Pat. Nos. 4,189,786 and 4,203,109, respectively issued to Adler and to Ballard et al., each disclose systems for communicating information between a submerged vessel and a buoy. The buoy, in turn, is capable of communicating with an aircraft. Alternately, U.S. Pat. No. 3,999,183 to Brett discloses a floatable radio antenna releasable from an underwater marine vehicle and which includes a solid hemisphere of conductive material concentric with a hollow hemisphere of dielectric material. The hemispheres are contained in a floatation jacket which carries them above the surface of a liquid on which the jacket floats. Concentric spheres can be used if desired. The dielectric material permits realization of an antenna of small physical dimensions.

No reference found in the prior art teaches a technique for identifying the characteristic frequencies of propeller-driven aircraft by an acoustic means. More importantly, the prior art does not teach long range detection of propeller-driven aircraft by acoustic means which would provide sufficient time for underwater marine vehicles to take evasive action. In particular, most of the methods do not appear to be clandestine and would tend to draw attention in crowded marine environment. Further, those techniques which include the transmission and reception of RF and UHF frequencies via a communication means would tend to disclose the position of the underwater marine vehicle.

Hence, those concerned with the development and use of acoustic detectors in the intelligence gathering field have long recognized the need for an improved acoustic detector for use in a marine environment which is capable of exploiting the sound amplification properties of the detector, is passive, clandestine, sensitive and simple in construction, is inexpensive to manufacture and deploy, overcomes the problems associated with underwater detection devices, and identifies the characteristic frequencies of propeller-driven aircraft at ranges which provide sufficient time for evasive action by the underwater marine vehicle. The present invention fulfills all of these needs.

SUMMARY OF THE INVENTION

Briefly, and in general terms, the present invention provides a new and improved marine acoustic detector construction which substantially increases the range at which propeller-driven aircraft can be passively detected by an underwater marine vehicle, and which significantly extends the time available for such an underwater vehicle to execute evasive tactics. Moreover, the detector construction of the present invention is capable of exploiting the natural sound amplification properties of the elements of the detector, is passive, clandestine, sensitive and simple in construction, is inexpensive to manufacture, and can be deployed from the underwater marine vehicle.

Basically, the present invention is directed to a new and improved marine acoustic detector and method of operation for improving the range at which propeller-driven aircraft can be passively detected by an underwater marine vehicle. This is accomplished by employing a surface-buoyed acoustic detector having a tuned resonator chamber for intercepting and amplifying the characteristic airborne sound frequency (Blade Passage Rate sound wave) generated by the propeller blades of a reconnaissance aircraft.

In accordance with the present invention, a dimensioned hole is formed in an endplate of the resonator air chamber which is tuned to the characteristic frequency generated by the propeller blade of said aircraft. The acoustic detector is thereafter mounted on a floatation buoy to position the resonator chamber for intercepting said characteristic air borne sound waves.

In accordance with the improved method of the present invention, the characteristic sound waves generated by the aircraft propeller blades are intercepted by the dimensioned hole in the surface-buoyed acoustic detector. The intercepted airborne sound frequencies resonate within the resonator chamber resulting in the very faintly audible or inaudible characteristic sound wave being detected and amplified by the natural acoustic properties of the Helmholtz resonator and by appropriate circuitry within the air chamber and thereafter transmitted via electrical cabling to the underwater marine vehicle for signal processing.

The new and improved marine acoustic detector and method of operation of the present invention permits detection of the characteristic airborne propeller blade sound waves at extended ranges over waterborne methods by utilizing the sound amplification properties of the resonator chamber. Also, the present invention provides an extremely simple but sensitive device for passively detecting propeller-driven aircraft and further can be incorporated into other known supporting structure.

These and other features and advantages of the instant invention will become apparent from the following more detailed description, when taken in conjunction with the accompanying drawings, which illustrate, by way of example, the features of the invention.

DETAILED DESCRIPTION OF THE PREFERRED EMBODIMENT

Figure 1:
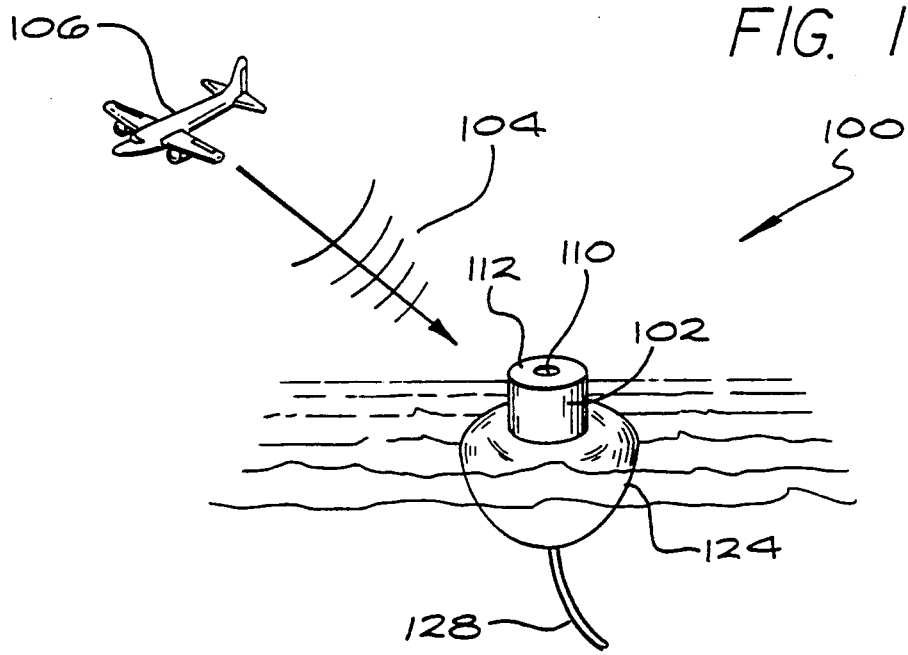
FIG. 1 is a perspective view of a marine acoustic aerobuoy supported in a marine environment in accordance with the present invention.

As shown in the drawings for purposes of illustration, the invention is embodied in a marine acoustic aerobuoy detector 100 of the type having a surface-buoyed air resonator chamber 102 for identifying a characteristic airborne sound pressure field 104 generated by a distant propeller-driven aircraft 106 and an appropriate sonic transducer circuit 108 for converting the sound pressure field into a detectable electrical signal for processing by an underwater marine vehicle.

Various methods have been utilized in the past in an attempt to identify reconnaissance type propeller-driven aircraft having the primary mission of locating and destroying underwater marine vehicles. Those methods have included an attempt by the underwater vehicle to intercept by underwater acoustic means the Blade Passage Rate sound wave generated by the aircraft propeller blades. However, the detection of aircraft by such underwater acoustic means is severely limited in range due to the physics of aircraft sound propagation in the ocean. Further, when sound waves do enter the ocean, they tend to bounce from the surface to the bottom in a zig-zag fashion resulting in substantial attenuation of the sound waves in horizontal range. Such attenuation results in the inability of an underwater detector to distinguish the sound waves from background noise.

Further, other methods disclosed in the prior art do not teach extended range detection of propeller-driven aircraft by acoustic means which would provide sufficient time for an underwater marine vehicle to execute evasive action. Further, several of the methods of the past do not appear to be clandestine and would tend to draw attention to or disclose the position of the underwater marine vehicle.

In accordance with the present invention, a dimensioned opening 110 formed within the surface-buoyed air resonator chamber 102 and the transducer circuit 108 cooperate to substantially increase the range at which propeller-driven aircraft 106 can be passively detected in a marine environment, and to significantly extend the time period available for an underwater marine vehicle to execute evasive tactics. Further, the detector 100 is capable of exploiting the sound amplification properties of the resonator chamber 102, is passive, clandestine, sensitive and simple in construction, is inexpensive to manufacture, and can be readily deployed from the underwater marine vehicle.

The function of the acoustic detector 100 is to amplify the sound waves of the received airborne sound pressure field 104 at a frequency controlled by the dimensions of the air resonator chamber 102 as hereinafter discussed with reference to FIG. 3. The air resonator chamber 102 can be cylindrical in shape such as a thin tube and must be "acoustically stiff" to sound waves. The material of the chamber must have a high impedance to the acoustic pressure field so that resonance can be achieved within the chamber. Examples of the possible material composition of the chamber 102 are hard plastic (such as PVC) or aluminum tubing of approximately an eighth inch thickness.

Figure 2:
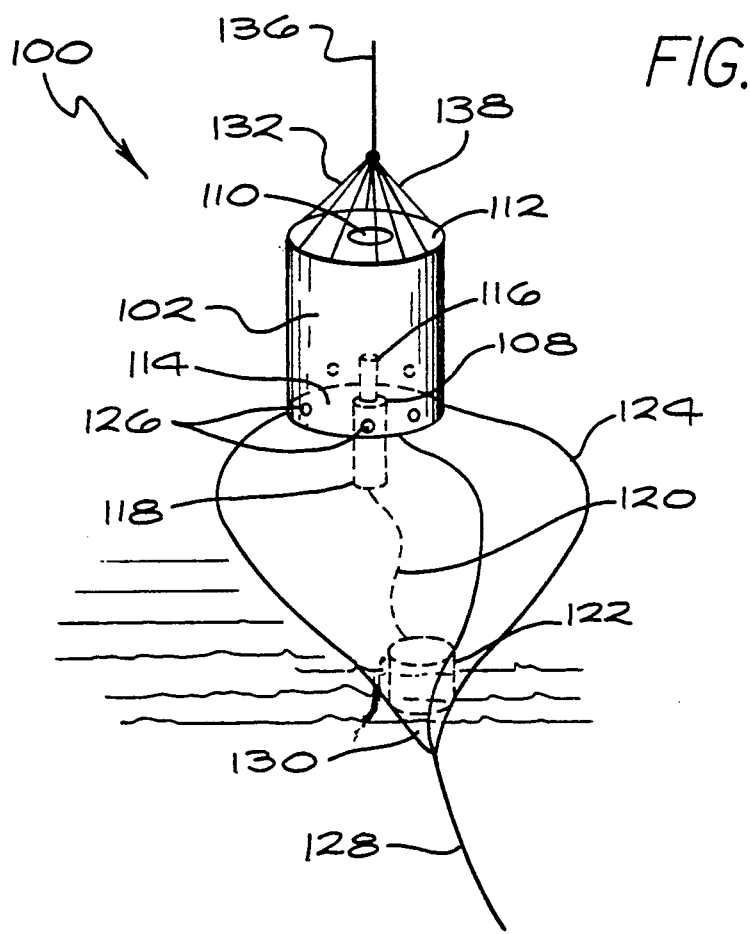
FIG. 2 is an enlarged perspective view, partly in phantom, of the marine acoustic aerobuoy of FIG. 1 illustrating transducer and support components.

The acoustic detector 100 includes a top endplate 112 and a bottom endplate 114 sealed to the tubular construction for completing the formation of the resonator chamber 102 as is shown in FIG. 2. The dimensioned opening 110 is formed in the top endplate 112 and functions to admit the airborne sound pressure field 104 generated by the distant aircraft 106. It is noted that the size of the resonator chamber 102 and the dimensioned opening 110 must be chosen to amplify the specific airborne frequencies of the propeller-driven aircraft 106 as is shown in FIGS. 1-3. The airborne frequencies of interest include specific aircraft propeller frequency rates which are, for example, below 100 Hz. The resulting dimensions are very reasonable as is disclosed hereinafter which permits the resonator chamber 102 to be tuned to resonate at a particular propeller frequency rate for activating the sonic transducer circuit 108. The apparatus is conceptually very simple to manufacture and deploy.

The sonic transducer circuit 108 is incorporated into the acoustic detector 100 for converting the resonating sound waves within the air chamber 102 into an electrical signal. The circuit 108 consists of a microphone 116 and a pre-amplifier 118 where the microphone is mounted flush with the cylindrical wall of the chamber 102 or on the inside of the bottom endplate 114 with the pre-amplifier. The resonator opening 110 must be properly dimensioned along with the volume of the resonator chamber 102 to compensate for the mounting location of the microphone and the pre-amplifier. The proper dimensioning of the air chamber and opening are necessary to ensure that the chamber will resonate at the frequency of the intercepted airborne sound pressure field 104. The function of the microphone 116 is to detect the naturally amplified resonating acoustic Blade Passage Rate sound wave within the resonator chamber 102 and to convert the sound wave to a weak electrical signal. Thereafter, the weak electrical signal is transmitted to the input terminal of the pre-amplifier 118 which delivers a boost to the signal amplitude for driving the signal a short distance along a coaxial cable 120 to an input terminal of a post-amplifier stage 122. The microphone 116 is chosen to be responsive to the frequencies of the narrow bandwidth which characterizes the intercepted sound waves.

The acoustic detector 100 is mounted on a supporting means, for example, a bladder-type floatation buoy 124. However, other types of supporting means are suitable and could be utilized. Also, the acoustic aerobuoy could be utilized with a trailing wire telemetry line in communication with a moving underwater vehicle or likewise, with a fiber optic telemetry line or with a standard type sonobuoy RF link to a distant receiver or satellite. The acoustic detector 100 can be affixed to the floatation buoy 124 in any suitable manner such as by gluing the bottom of the endplate 114 to the top of the buoy. Also, the buoy can be equipped with a seam projection having a plurality of eyelets formed therein for facilitating the sewing of the detector to the projection. Further, the detector could be bolted to a plate that is either glued or sewn to the top of the buoy 124. The cylindrical wall of the chamber 102 includes a plurality of small drain holes 126 for permitting sea water to gravity drain from the inside of the resonator air chamber 102.

The coaxial cable 120 electrically connects the output terminal of the pre-amplifier 118 to the input terminal of the post-amplifier stage 122 which is supported within the bottom portion of the floatation buoy 124. The coaxial cable, which can also be a multi-coaxial or other suitable cable, passes through the length of the floatation buoy 124 prior to terminating in the post-amplifier stage. The post-amplifier stage 122 (also known as a "signal conditioning can") can be a secondary amplifier which receives the pre-amplified signal for further amplification. The post-amplifier stage 122 can include a direct current voltage supply which is utilized for adjusting the voltage of the pre-amplifier 118 to the proper level. Such action will ensure that the amplitude of the original weak signal provided by the microphone 116 is increased and not lost in background noise. In the alternative, the post amplifier stage can include a battery for energizing the pre-amplifier 118 and the electronics of the microphone 116 for driving the pre-amplified transduced signal along the coaxial cable 120. The pre-amplified signal must be sufficiently amplified to be transmitted across approximately one foot of the coaxial cable 120 without being substantially attenuated. The post-amplifier stage 122 thereafter amplifies the pre-amplified signal and transmits the signal along an electrical or fiber optic transmission cable 128 to the underwater vehicle for signal processing.

The bottom of the buoy also includes a hydrodynamic ballast 130 such as a lead weight for lowering the center of gravity and improving the stability of the buoy while deployed at sea. Notwithstanding the ballast 130 and the small drain holes 126, high seas will cause the resonator chamber 102 to be periodically flooded. In an attempt to minimize the volume of sea water entering the chamber, the detector 100 is equipped with a wave splash shield tent 132. The shield tent 132 is comprised of a semi-porous material such as course weave nylon or other suitable material. Although the shield tent will impede the passage of sea water therethrough, the tent is "acoustically transparent" so as not to impede the passage of sound waves.

Figure 4:
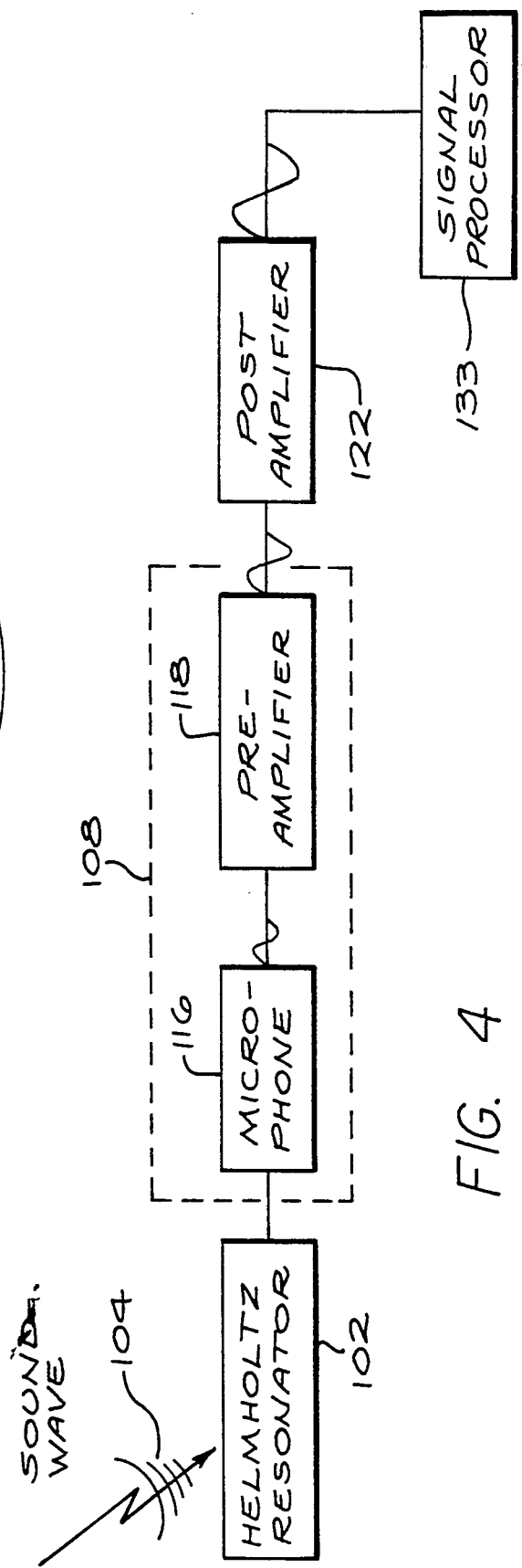
FIG. 4 is a general block diagram illustrating the sonic and electrical components of the marine acoustic aerobuoy of FIG. 1.

The surface-buoyed air resonator chamber 102 located within the acoustic aerobuoy detector 100 can be, for example, a Helmholtz resonator. The dimensions of the resonator chamber 102 volume, opening 110 surface area and neck length, are carefully chosen so that the chamber will resonate at the frequency of the airborne sound pressure field 104 received from the approaching aircraft. When the airborne sound pressure field is intercepted, the resonate chamber 102 resonates thereby greatly amplifying the sound waves. For example, an aircraft acoustic blade passage rate (frequency) of sixty (60) Hz would undergo 44 decibels (dB) of received sound amplification within a resonator chamber 102 having a volume of approximately one cubic foot and a dimensioned opening 110 of approximately one inch diameter. The resonating sound waves are detected by the microphone 116 located inside the chamber and converted into an electrical signal. The electrical signal is then delivered to the pre-amplifier 118 and the post-amplifier stage 122 prior to transmission along cable 128 to an underwater vehicle (or surface craft) for signal processing by an on-board signal processor 133 as shown in FIG. 4.

Figure 3:
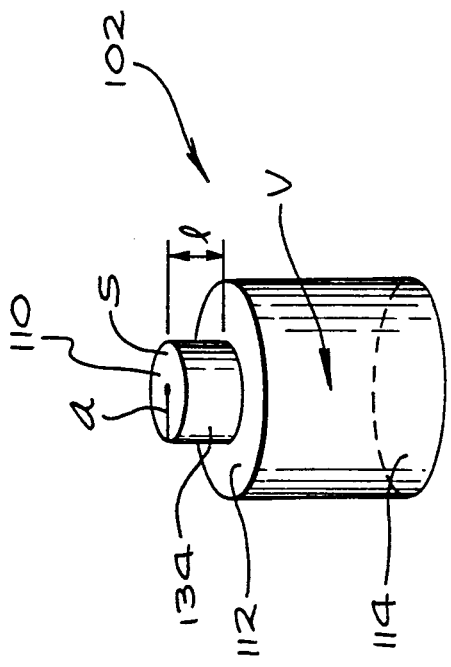
FIG. 3 is a perspective view, partly in phantom, of an acoustic resonator chamber of the marine acoustic aerobuoy of FIG. 1.

After intercepting the sound pressure field 104, the resonator chamber 102 amplifies the airborne sound waves at a frequency controlled by the dimensions of the chamber as described in equations 1 and 2 below:

$$\text{Frequency of Resonance} = \frac{c}{2\pi} \left[ \frac{S}{l'V} \right]^{\frac{1}{2}} \quad (1)$$

$$\text{Amplification in dB} = \log_{10} \frac{4\pi^2 \, V(f)^3}{S^3} \quad (2)$$

where "c" is equal to the speed of sound in air, "S" is equal to the area of the dimensioned (resonator) opening 110, "l'" is equal to the effective (vertical) neck length of the dimensioned (resonator) opening 110 as shown in FIG. 3, and "V" is the volume of the resonator chamber 102. The chamber is comprised of a defined volume of approximately one cubic foot and including a pronounced vertical neck 134 having a length dimension "l" as shown. The effective neck length "l'" is equal to the length "l" of the pronounced vertical neck 134 plus a delta correction factor (2§1) which accounts for inducted mass (such as air) to an unflanged neck of the resonator chamber 102. The radius of the dimensioned opening 110 is shown as "a" and is equal to one-half the diameter or approximately one-half inch.

The following example is designed to illustrate that for frequencies of interest, the dimensions of the acoustic aerobuoy detector 102 as noted above are reasonably suitable for implementation in a device of this type. The detector provides high amplification of the airborne sound pressure field 104 using only the acoustic properties of the resonator chamber in a marine environment. The dimensions are selected to provide a particular chamber volume which will resonate upon intercepting an airborne sound pressure field of a particular frequency as noted in equation (1). The design volume is then used to calculate the amplification factor as recited in equation (2).

Since frequency in radians (wo) is equal to $(2\pi)$ x frequency, equation (1) may be rewritten as follows:

$$w_o = c \left[ \frac{S}{l' V} \right]^{\frac{1}{2}} \quad (3)$$

By squaring equation (3), the square root radical is lifted which provides:

$$w_o^2 = \frac{c^2 S}{l' V} \quad (4)$$

By transposing equation (4), an expression for the volume is:

$$V = \frac{c^2 S}{w_o^2 \, l'} \quad (5)$$

In order to determine the volume of the resonator chamber 102, parameters for the speed of sound "c" in air, the area "S" of the dimensioned opening 110, the effective neck length "l'", and the frequency in radians "wo" must be determined. The speed of sound in air at twenty degrees centigrade is:

$c = [343$ meters per sec./0.3048 meters per ft.$]$ $c = 1125$ ft./sec.

The area "S" of the dimensioned opening 110 is:

$S = \pi a^2 = \pi (0.5/12)^2$ ft.$^2 = 0.0109$ ft.$^2$.

If the frequency of the sound pressure field 104 is assumed to be 60 Hz, then the frequency in radians $w_o = 120\pi$. Finally, the effective neck length "l'" is:

$l' = l + 2\delta l = 1 + 2(0.6a)$ inches for an unflanged neck of the resonator chamber. Further calculation provides $l' = [0.5/12 + 2(0.6)(0.5/12)] = 0.09$ ft.

By inserting each of these parameters into equation (5), the resonator chamber volume 102 at an acoustic blade passage rate of 60 Hz is 1.06 ft.$^3$. Further, by employing the above calculated information in equation (2) above, the amplification in dB or amplification factor "n" can be determined to be equal to 44 dB. Based upon this amplification factor by the resonator chamber, further calculations can be performed to determine the approximate range at which the airborne sound pressure field 104 can be detected from the approaching propeller-driven aircraft 106.

Hence, one of the main advantages of the present invention is the acoustic aspects of the aerobuoy detector 100. Such an advantage includes the feature that the detector can intercept the frequency of faint airborne acoustic sound levels in a marine environment that correspond to the resonant frequency of the resonator chamber 102, to convert the faint airborne sound level to an electrical signal that is amplified over four orders of magnitude (40 dB = amplification factor of 10,000), and to transmit the amplified signal to a remote submerged vehicle or surface craft.

Since the acoustic aerobuoy detector 102 can also be utilized with other transmission media, the post amplifier stage 122 (or signal conditioning can) can be incorporated with radio frequency (RF) telemetry. In such a scheme, an antenna 136 can be incorporated into the design. The antenna 136 can potentially serve many purposes.

The antenna 136 can be utilized to intercept radar emissions from reconnaissance aircraft scanning the surface of the ocean. Such interceptions are then relayed to the underwater vehicle for effecting evasive action. Further, the antenna 136 can be employed to radiate the pre-amplified microphone signal in RF form to a friendly signal receiving station (e.g., shore station, surface or aircraft, or satellite) for communicating the location of the reconnaissance aircraft. Finally, the antenna 136 can be used as a radio link to a friendly aircraft for transmitting and receiving messages between the friendly aircraft and the underwater vehicle. The mode employed for transmitting the information can be any suitable mode such as digital or analog and can be effected via a dedicated or multiplexed communication scheme.

The antenna 136, which can be mounted atop the splash shield tent 132, is an optional feature of the acoustic aerobuoy detector 100. This is the case since the dimensioned opening 110 will intercept the sound pressure field 104 without the need for the antenna.

The sound amplification properties of the resonator chamber 102 provide an extremely simple but sensitive device for passively detecting propeller-driven aircraft in a marine environment at airborne ranges exceeding those ranges of normal visual or sonar detection. This feature is an important advantage of the present invention.

From the foregoing, it will be appreciated that the marine acoustic aerobuoy detector 100 of the present invention permits identification of the characteristic airborne sound waves generated by propeller-driven aircraft 106 at extended distances, thereby increasing the time available for the underwater marine vehicle to execute evasive action. Further, the detector 100 is sensitive and structurally simple permitting the use of common construction materials. Since the detector can be readily released from the underwater vehicle and need only intercept the airborne sound pressure field 104 propagated by the aircraft propeller blades, the device operates in a passive, clandestine manner minimizing the likelihood of discovery by aircraft instrumentation.

While a particular form of the invention has been illustrated and described, it will be apparent that various modifications can be made without departing from the spirit and scope of the invention. Accordingly, it is not intended that the invention be limited, except as by the appended claims.

What is claimed is:

1. A marine acoustic detector for identifying a plurality of airborne sound waves generated by a propeller-driven aircraft comprising, in combination:

means for forming a resonating air chamber within said acoustic detector, said chamber being tuned to the frequency of said plurality of airborne sound waves generated by said aircraft and being in mechanical communication with a first endplate and a second endplate;

means for intercepting said plurality of airborne sound waves generated by said aircraft, said intercepting means being formed in said first endplate and said frequency of said plurality of airborne sound waves being from a narrow band of frequencies, said plurality of sound waves resonating within said chamber;

means for detecting said plurality of resonating airborne sound waves and for converting said plurality of detected airborne sound waves to an electrical signal, said detecting and converting means being mounted inside said chamber;

means for amplifying said electrical signal, said amplifying means being in electrical communication with said detecting means; and means for supporting said acoustic detector in a marine environment, said supporting means in communication with said second endplate, said amplified electrical signal being transmitted to a signal processor operating in a marine environment, the sound amplification properties of said resonating chamber being employed for passively detecting said aircraft at airborne ranges exceeding those ranges of visual and sonar detection.

2. The marine acoustic detector of claim 1 wherein said means for forming a resonating chamber is a cylinder.

3. The marine acoustic detector of claim 2 wherein said cylinder has a volume of approximately one cubic foot.

4. The marine acoustic detector of claim 1 wherein said intercepting means is a dimensioned opening formed in said first endplate.

5. The marine acoustic detector of claim 4 wherein said dimensioned opening has a diameter of approximately one inch.

6. The marine acoustic detector of claim 1 wherein said means for detecting said plurality of resonating sound waves is a microphone.

7. The marine acoustic detector of claim 6 wherein said microphone has a low frequency response.

8. The marine acoustic detector of claim 1 wherein said means for amplifying said electrical signal is an electronic amplifier.

9. The marine acoustic detector of claim 1 wherein said supporting means is a bladder-type floatation buoy.

10. The marine acoustic detector of claim 1 further including a plurality of drain holes formed in the chamber bottom for providing a sea or rain water drain path from said resonating chamber.

11. The marine acoustic detector of claim 1 wherein said means for forming a resonating chamber is comprised of a material having a high acoustic impedance.

12. The marine acoustic detector of claim 1 further including a splash shield tent mounted over said intercepting means for controlling admission of water into said resonating chamber.

13. The marine acoustic detector of claim 1 wherein said detecting means and said amplifying means are waterproofed.

14. The marine acoustic detector of claim 1 further including a post-amplifier stage for further amplifying said electrical signal, said post-amplified electrical signal being transmitted across a transmission cable to said signal processor.

15. The marine acoustic detector of claim 14 wherein said amplifying means is electrically connected to said post-amplifier stage by a cable.

16. The marine acoustic detector of claim 1 further including an antenna for intercepting radiated electromagnetic signals from said aircraft.

17. A marine acoustic detector for identifying a plurality of airborne sound waves generated by a propeller-driven aircraft comprising, in combination:

means for forming a resonating chamber within said acoustic detector, said chamber being tuned to the frequency of said plurality of airborne sound waves generated by said aircraft and being in mechanical communication with a first endplate and a second endplate;

means for intercepting said plurality of airborne sound waves generated by said aircraft, said intercepting means being formed in said first endplate and said frequency of said plurality of airborne sound waves being from a narrow band of frequencies, said plurality of airborne sound waves resonating within said chamber;

means for detecting said plurality of resonating sound waves and for converting said plurality of detected sound waves to an electrical signal, said detecting and converting means being mounted inside said chamber;

means for pre-amplifying said electrical signal, said pre-amplifying means being in electrical communication with said detecting means;

means for supporting said acoustic detector in a marine environment, said supporting means in communication with said second endplate; and means for post-amplifying said pre-amplified electrical signal, said post-amplifying means being electrically connected to said pre-amplifying means by a cable, said post-amplified electrical signal being transmitted across a transmission cable to a signal processor operating in a marine environment, the sound amplification properties of said resonating chamber being employed for passively detecting said aircraft at airborne ranges exceeding those ranges of visual or sonar detection.

18. A method for identifying a plurality of airborne sound waves generated by a propeller-driven aircraft in a marine environment, said method comprising the steps of:

forming a resonating chamber within an acoustic detector, said chamber being tuned to the frequency of said plurality of airborne sound waves generated by said aircraft and being in mechanical communication with a first endplate and a second endplate;

intercepting said plurality of airborne sound waves generated by said aircraft, said intercepting of said airborne sound waves being accomplished by an opening formed in said first endplate, said frequency of said airborne sound waves being from a narrow band of frequencies and said plurality of sound waves resonating within said chamber;

detecting said plurality of airborne sound waves within said chamber and converting said plurality of detected sound waves to an electrical signal, said detecting and converting of said sound waves being completed within said chamber;

pre-amplifying said detected and converted electrical signal, said pre-amplified electrical signal being provided for indicating the presence of said plurality of airborne sound waves;

supporting said acoustic detector at said second endplate, said supporting of said detector occurring by marine floatation; and transmitting said pre-amplified electrical signal to a signal processor operating in a marine environment, the sound amplifying properties of said resonating chamber being employed for passively detecting said aircraft at airborne ranges exceeding those ranges of visual or sonar detection.

19. The method as recited in claim 18 further including the step of post-amplifying said pre-amplified electrical signal, said post-amplified electrical signal being transmitted across a transmission cable for signal processing.

20. The method as recited in claim 18 further including the step of waterproofing said acoustic detector and providing a drain path from said resonating chamber.

* * * * *